Patented May 20, 1941

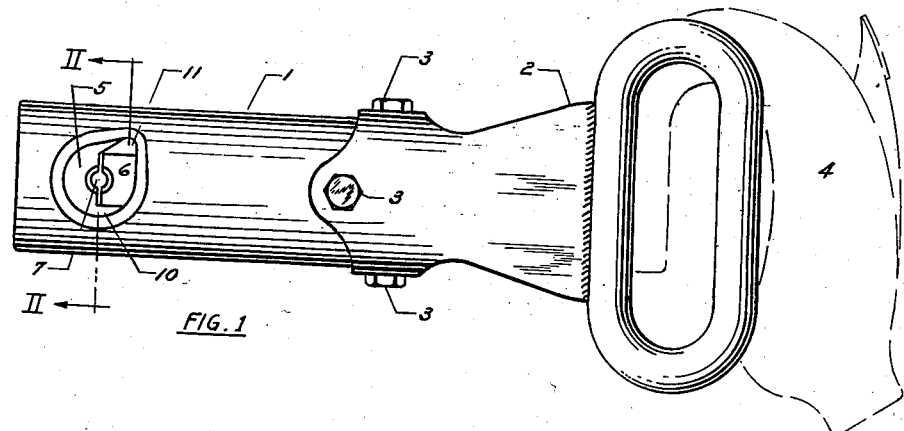
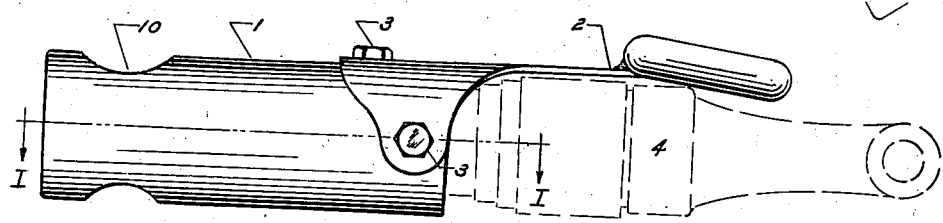
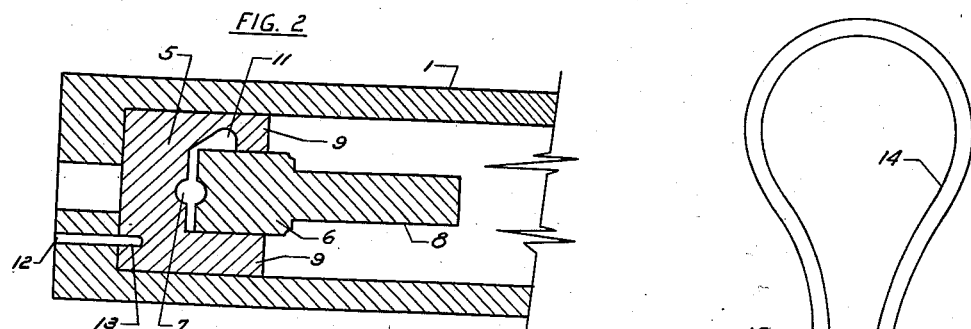
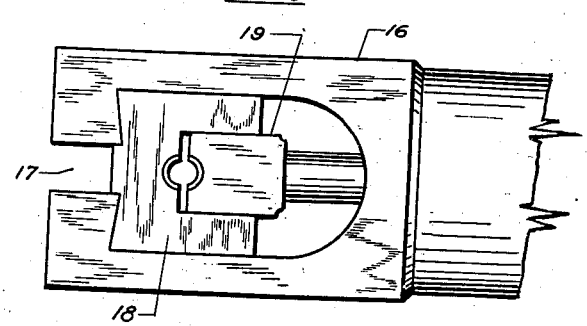
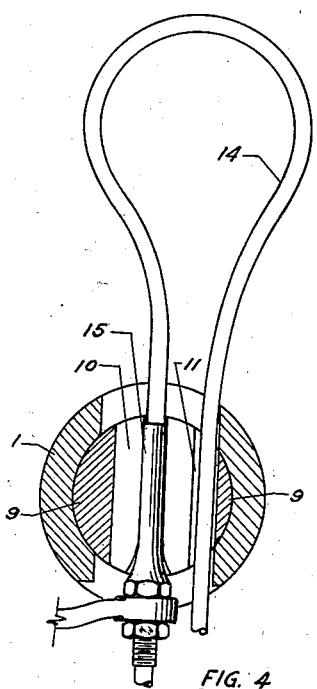

2,242,280

UNITED STATES PATENT OFFICE 2,242,280

SWEDGING TOOL

Alfred Henry Adams, Burbank, Donald Murphy, Glendale, and Silas E. Williams, Burbank, Calif.

Application February 24, 1939, Serial No. 258,258

4 Claims. (Cl. 140—113)

This invention relates to metal forming or swedging tools, and more particularly to a tool employing as a motive agent a compressed air hammer or riveting hammer, or its equivalent, to bring by its hammering action a movable forming die element into repeated and violent contact with the work.

The preferred embodiment, as shown by the drawing and hereinafter described, discloses a tool employing a compressed air riveting hammer as a power source, said tool being of the type well adapted for the compressing or swedging of cylindrical metal sleeves or metal end fittings having a longitudinal bore therein to cables, wires, rods, or other similar articles. By the use of a tool constructed in accordance with the present invention, an intimate bond capable of transmitting high loads is produced between the cable and/or wire and/or rod, (hereinafter referred to as "cable") and the sleeve and/or end fitting (hereinafter referred to as "fitting"). It is to be understood, however, that this invention is not limited to the detail design herein disclosed, as it will be obvious to all that modifications and changes must be made depending on the size and type of work for which the tool is intended.

In the present application, the tool has been designed for use with a standard compressed air riveting hammer of the type used in metal aircraft construction and for the purpose of connecting metal aircraft control cables to the necessary fittings by compressing the fitting around the cable, thus producing a joint of sufficient mechanical strength to sustain the high stresses imposed on such cables. It is to be understood, however, that while the tool as shown is particularly designed for the above stated purpose, it may be effectively employed for other work in which the hammering action of an impact element is an essential requirement.

While the use of swedged fittings on aircraft control cables is becoming a common practice, the tools available to perform this operation are of heavy and expensive design. In order to efficiently use these types of tools it is necessary to cut the cables to standard lengths and add the required fittings before installation in the airplane. Such methods necessitate both generous tolerances and suitable means for absorbing the tolerances after installation. However, it is frequently necessary to measure cables by fitting them to the airplane after which they must be removed and the required fittings added before final installation can be made. Also, it is often necessary for aircraft operators to make repairs on control systems which, in some cases, require replacement parts from the manufacturer, thus involving delays and loss of service.

In cable control systems it is frequently desirable to install swedged stops on the cables to limit the travel thereof, or to assure a fixed relation between the cable and some element, such as a pulley. Such stops are more readily located after the cables are installed in the airplane and may be easily secured to the cable by a small portable swedging tool of the type disclosed.

There are many other types of work which require a swedging operation only, and to which the dual function of the compressed air riveting hammer would not be an advantage. For such work the tool might be constructed integral with a compressed air hammer or its equivalent. By the use of the word "equivalent" it is desired to include all other types of tools capable of transmitting a hammering action to a forming die element such as a steam hammer or an electric hammer. It will also be apparent that tools of large size employing greater source of power may require means other than that herein disclosed to maintain the swedging tool and the power source in operable relation. All such modifications are to be considered within the scope of this invention.

A tool of this type might also be employed to swedge terminals to electrical wiring, thus eliminating the present method of soldering and the accompanying undesirable characteristics.

Therefore, it is the primary object of this invention to provide a forming or swedging tool employing as a power source a compressed air riveting hammer, or its equivalent.

Another object of this invention is to provide a tool to be used in combination with a compressed air riveting hammer, or its equivalent, for the purpose of swedging fittings or connectors to stranded wire cable or other similar articles.

Another object of this invention is to provide a swedging tool so designed as to increase the utility of the existing compressed air riveting hammer.

Another object of this invention is to provide a portable tool of small size, light weight and simple construction, capable of performing a swedging operation in a limited space.

Still another object of this invention is to provide a swedging tool embodying the aforementioned desirable characteristics and fitted with removable complemental die elements whereby different sizes and types of dies may be used in the same mounting, thus attaining a considerable variation in size and type of work.

These and other objects and advantages are attained by this invention and may be readily understood by reference to the accompanying drawing in which:

Figure 1 and Figure 2 are two assembled views of the invention showing its relation with respect to the compressed air riveting hammer indicated by the dotted outline.

Figure 3 is a longitudinal section along the line I—I of Figure 2 showing the various elements of the tool.

Figure 4 is a transverse section along the line II—II of Figure 1 with the movable die element removed, showing the method of looping the cable through the tool.

Figure 5 is an assembled view showing another form of the invention.

Referring to the drawing, 1 represents the body or frame of the tool to which a handle 2 is attached by bolts 3. The frame 1 is adapted to slidably receive the barrel of a standard compressed air hammer 4 of the type used in metal aircraft construction. A stationary die element 5 supported by the frame 1 serves as an anvil for the movable complemental die element 6. These die elements are made with complemental grooves 7 of a shape and size dependent upon the type of work to be performed. The movable die element 6 is formed with a shank 8 to be slidably received by the barrel of the riveting hammer 4 and of sufficient length to engage the piston or hammering element therein. The stationary die element 5 is made with flanges 9 to slidably receive and guide the movable die element 6, thus maintaining constant alignment of the complemental grooves 7. An elongated hole 10 extending transversely through the frame 1 allows the placing of work between the die elements 5 and 6. A groove 11 in the flange 9 of the stationary die element 5 aligns with the elongated portion of the hole 10 thus creating a passage transversely through the tool. The die elements 5 and 6 are maintained in alignment with the hole 10 by the pin 12 affixed to the frame 1 and engaging a hole 13 in the stationary die element 5.

In operation, the handle 2 of the tool is held in one hand simultaneously with the handle of the riveting hammer 4. By relaxing the grip, the dies may be parted and work inserted after which the grip is tightened and the riveting hammer 4 put into operation. It has been found that by slowly rotating the work during the swedging operation a more uniform and intimate bond is produced. By separating the tool from the riveting hammer 4, the die elements 5 and 6 may be removed and a new pair adapted to a different size or type of work inserted.

In all work involving end fittings or short lengths of cable to be fitted with stops, a free end of the cable may be passed through the hole 10 and between the die elements 5 and 6 to any desired position along the cable. However, it is frequently necessary to secure a stop or other fitting in position on a cable attached at both ends; in which case the cable 14 having a fitting 15 to be secured in place on the cable may be looped and passed through the hole 10 as illustrated in Figure 4, thus one side of the loop occupies the passage created by the groove 11 in the flange 9 of the stationary die element 5 and is protected from the hammering action of the dies during the swedging of the fitting 15 to the cable 14. To use the tool in this manner it is, of course, necessary to have a certain amount of slack in the cable.

Figure 5 shows another form of the tool in which part of the frame 16 is square or rectangular in section and is provided with a slot 17 and a stationary die element 18 capable of being removed from the side. The movable die element 19 may be substantially the same as the movable die element 6 shown in Figure 3. This embodiment is particularly applicable to connecting sections of cable by inserting the ends of the cables into the ends of a connector tube and then subjecting the tube to a swedging operation. After such an operation the stationary die element 18 may be removed and the cable withdrawn through the slot 17.

While the preferred embodiments have been shown and described, it will be evident to those skilled in the art that this invention permits many changes, modifications and uses without departing from the spirit and scope of the appended claims.

What we claim is:

1. In combination with a compressed air hammer, a swedging device comprising a frame movable relative to said hammer, a stationary die element supported by the frame, a movable die element aligned with said hammer to receive impacts therefrom, an opening extending transversely through said frame for placing work between said die elements, and means for operating said swedging device from said compressed air hammer such that said movable die element will exert a rapid hammering action upon the work.

2. A swedging device comprising a portable pneumatic hammer having a handle and a shank, a swedging frame embracing the shank of said hammer and movable therealong, a handle on said frame in juxtaposition to the hammer handle and adapted to shift said frame relative to the hammer, a stationary die element carried by said frame in alignment with the hammer, said stationary die element having flanges for slideably receiving and aligning a movable die element, and a movable die element associated with said hammer to receive the blows thereof, said die being movable in the flanges of the stationary die element, whereby the frame and stationary die element can be shifted relative to the hammer and movable die element to separate the die elements.

3. A swedging device comprising a portable pneumatic hammer having a handle and a shank, a swedging frame in alignment with the shank of said hammer and movable relative thereto, a handle on said frame in juxtaposition to the hammer handle and adapted to shift said frame relative to the hammer, a stationary die element carried by said frame in alignment with the hammer, said stationary die element having flanges for slideably receiving and aligning a movable die element, and a movable die element associated with said hammer to receive the blows thereof, said die being movable in the flanges of the stationary die element, whereby the frame and stationary die element can be shifted relative to the hammer and movable die element to separate the die elements.

4. A portable swedging device for use with a portable pneumatic hammer, comprising a swedging frame supported on and in alignment with the axis of the hammer, said frame having an open slot in its outer end and transverse apertures, a stationary die element removably inserted through said apertures and supported by said frame across the open slot, a movable die element having guiding means associated with said stationary die element, said movable die element being associated with the pneumatic hammer to receive the impacts thereof, and means for moving said swedging frame relative to the hammer to separate the die elements and permit removal of the stationary die element to facilitate removal and application of the swedging device to an intermediate portion of the material being worked upon.

ALFRED HENRY ADAMS.
DONALD MURPHY.
SILAS E. WILLIAMS.